United States Patent [19]

Facon

[11] 4,100,747
[45] Jul. 18, 1978

[54] SWELL ABATEMENT DEVICE

[75] Inventor: Pierre Jean Alphonse Facon, Le Perray en Yvelines, France

[73] Assignee: Bertin & Cie, Plaisir, France

[21] Appl. No.: 713,230

[22] Filed: Aug. 10, 1976

[51] Int. Cl.² .............................................. E02B 3/06
[52] U.S. Cl. .......................................................... 61/5
[58] Field of Search ............................. 61/5, 4, 3, 2, 1

[56] References Cited

U.S. PATENT DOCUMENTS

| 2,584,867 | 2/1952 | Guarin | 61/5 |
| 3,197,963 | 8/1965 | Frederiksen | 61/5 |
| 3,863,455 | 2/1975 | Fuller | 61/5 |

FOREIGN PATENT DOCUMENTS 1,373,035  11/1974  United Kingdom ...................... 61/5

Primary Examiner—Jacob Shapiro
Attorney, Agent, or Firm—A. W. Breiner

[57] ABSTRACT

The swell of a body of water is abated by dissipation of its hydraulic energy in response to variations of water head under the crest and under the trough of the waves. For this purpose, an enclosure is toto submerged in this body of water. It has on the one hand orifices designed to allow only a one-way flow of water upon exertion of a differential pressure of given sign, and on the other hand restricted or throttled passages designed to produce duct losses upon traverse thereof by water.

3 Claims, 7 Drawing Figures

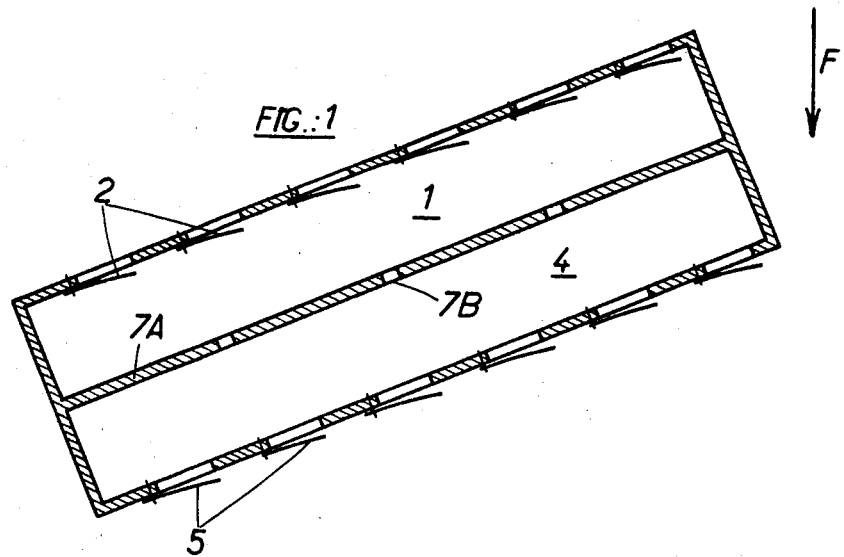
FIG.:1
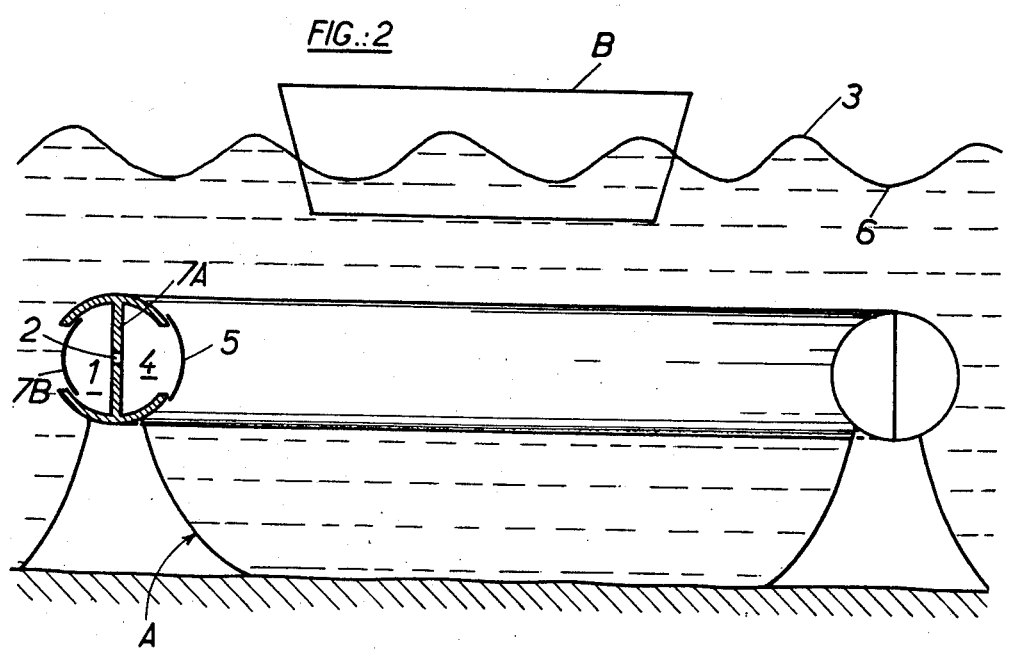
FIG.:2

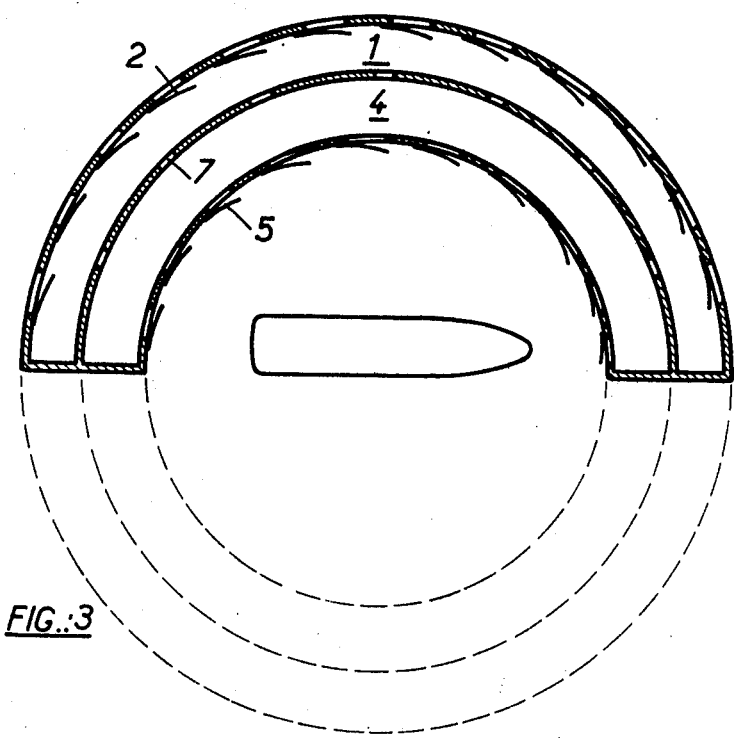
FIG.:3
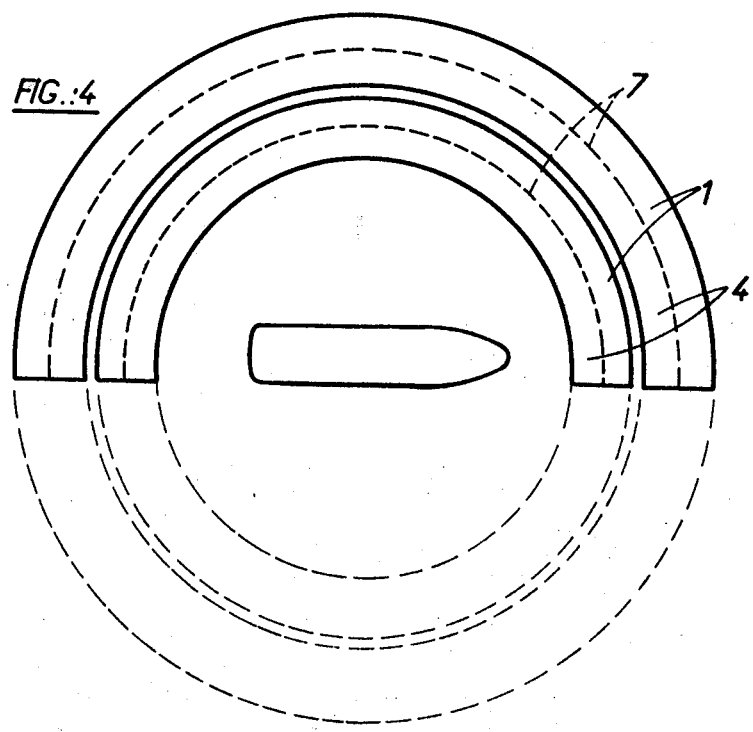
FIG.:4

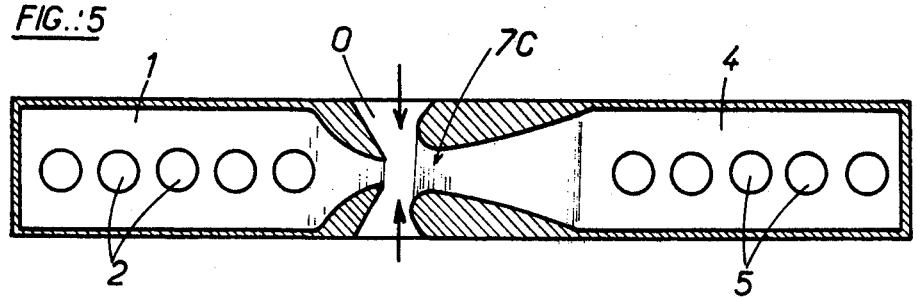
FIG.:5
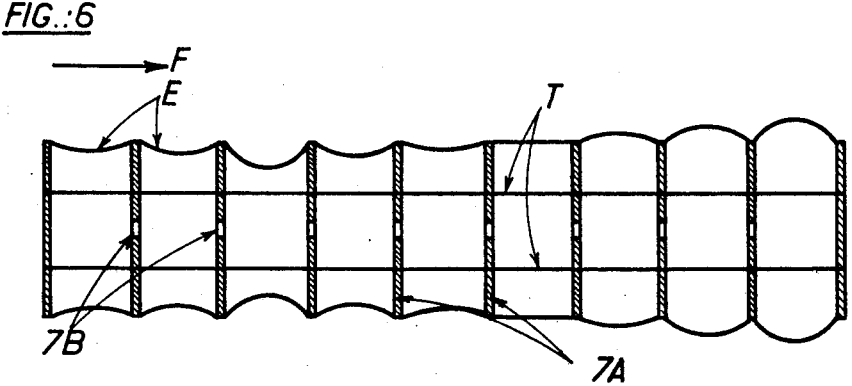
FIG.:6
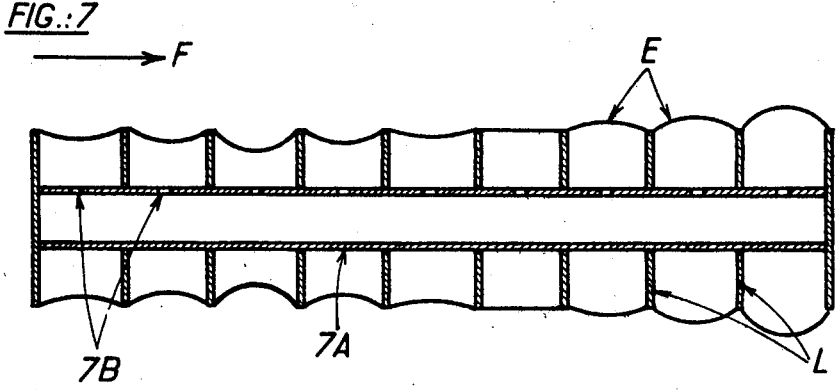
FIG.:7

SWELL ABATEMENT DEVICE

The present invention relates to a device which may be called a "break-swell" and which operates in a submerged position to the effect of establishing at the surface a relatively quiescent zone. It has a particularly interesting application in the protection of civil engineering structures such as off-shore work platforms, moles and piers, or in the stabilisation of buoyant bodies such as lighters used for laying undersea pipelines, or else in the setting up of a drawing alongside area for boats or an alighting and taking-off area for seaplanes.

This device is basically designed as a damper in the enclosure of which fluid is circulated with large duct losses by means of sensors responsive to variations in instantaneous hydrostatic pressure under the surface, due to variations in the water head straight below the crest and trough of the waves. From its very design, such a device is adapted to collect water under the crest of the waves and conversely to return water under the trough of the waves, whereby the swell is sort of flattened out or in other words its amplitude is reduced.

In an embodiment of the present invention, the device comprises at least one submarine enclosure equipped on the one hand with one or more orifices designed to allow only a one-way flow of water in response to a differential pressure of predetermined sign, and on the other hand one or more restricted or throttled passages designed to dissipate or waste hydraulic energy. The one-way orifices can ensure:

either the inlet of water into the enclosure upon external overpressure, in which case the restricted passages allow out-flow of water from the enclosure, or, to the contrary, the outlet of water from the enclosure upon internal overpressure, in which case the restricted passages allow in-flow of water into the enclosure.

The device will preferably comprise at least two enclosures which are respectively of the former and of the latter of the above-defined kinds, the restricted passages being common to both enclosures and being interposed therebetween so that the former discharges into the latter.

The one-way orifices may comprise check-valves which open as soon as the pressure differential reaches a given threshold and close back under a return force.

In an alternative embodiment of the present invention, the submarine enclosure is in the general form of a watertight resilient bag having a deformable envelope and being conveniently partitioned into contiguous chambers communicating with each other through sized duct-loss passages.

In the accompanying drawings:

FIG. 1 is a diagrammatic longitudinal section of an embodiment of the present invention.

FIG. 2 schematically illustrates in elevation an arrangement for carrying out the invention.

FIGS. 3 and 4 are like illustrations in plane.

FIGS. 5, 6 and 7 are views similar to FIG. 1, showing alternative embodiments of the present invention.

The device of FIGS. 1 and 2, which is designed for operation in a totally submerged position, comprises two enclosures 1 and 4 separated by a ported partition 7A presenting sized orifices 7B designed to dissipate by turbulence the kinetic energy of a flow therethrough. The inside of enclosure 1 may be in communication with the outside by the lifting of check-valves 2 distributed over the whole or part of the length of the enclosure. Valves 2 are adjusted to open when the external pressure is slightly greater than the internal pressure.

The external pressure which is equal to the water head above a check-valve 2, will be greatest on the vertical of a crest 3 of the wave. Therefore the valves 2 will tend to open under the crest 3 of the wave. As the wave progresses, the valves open and then close back in register with the wave progression. If the size of enclosure 1, as measured parallel to the direction F of motion of the wave, is at least equal to the wavelength of the swell, there will always be one or more valves 2 under a crest. Therefore the pressure obtaining inside enclosure 1 constantly tends to reach a value near the maximum pressure corresponding to the water head under the crest of a wave. In practice, this pressure in enclosure 1 will however be lower than the maximum pressure since it also depends on the flow through the sized orifices 7B.

The second enclosure 4 also comprises a set of check-valves 5 which open in the opposite direction from those of enclosure 1 : these check-valves 5 are adjusted to open when the external pressure is slightly smaller than the pressure obtaining in enclosure 4. Therefore the valves 5 will tend to open under the trough 6 of the wave. Likewise to enclosure 1, if the size of enclosure 4 parallel to wave motion F is at least equal to the wavelength of the swell, there will always be one or more valves 5 under a trough. So, the pressure obtaining inside enclosure 4 constantly tends to reach a value near the minimum pressure corresponding to the water head under the trough of a wave. In practice, this pressure in enclosure 4 will however be greater than the minimum pressure since it also depends on the flow through the sized orifices 7B.

The pressure divergence between the two enclosures 1 and 4 is substantially constant and a function of the amplitude of the waves. Moreover the sequence of operation of the inlet valves 2 is the same as that of the outlet valves 5, but with a phase-shift of $\pi$ corresponding to half a wavelength of the swell.

This device may be grounded on the sea-bottom in case of small depths; otherwise, it may be maintained above the sea-bottom by means of buoys or, if it presents a positive buoyancy, it will be anchored to the bottom by a set of mooring lines A. In such a case, the immersion depth must be sufficient in order to allow traffic of ships, for example lighters B.

The shape of the enclosures is immaterial: rectangular, semi-circular or even circular as in FIG. 3.

If necessary, when the damping effect is not deemed sufficient, it would be possible to juxtapose several devices of the same type, arranged in series, as shown in FIG. 4 where they number two for example.

FIG. 5 illustrates an alternative embodiment of the invention wherein communication between the two enclosures 1 and 4 is through a static-pump venturi 7C sucking in water from the outside through intakes 0, thus increasing the water flow discharged by the second enclosure 4.

Stationary or orientable vanes fitted at the edge of check-valves 2 and 5 allow modifying the flow direction so as to cancel the thrust exerted on the device and avoid its displacement under the action of the waves.

In the alternative embodiments of FIGS. 6 and 7, any inlet or outlet valve is done without, and the enclosure is merely a deformable watertight bag bounded by an outer flexible envelope E and partitioned into a series of chambers communicating with each other through sized orifices 7B. In the example of FIG. 6, envelope E is supported by a succession of partitions 7A which are kept apart from each other by spacer means T. An equivalent flexible envelope structure is met again in FIG. 7, being supported by rigid fins L integral with a likewise rigid tube 7A pierced with sized orifices 7B for communication of the various chambers thus formed.

In both the above cases, the watertight flexible bag contains a constant mass of liquid or possibly of gas. As the wave propagates in the direction F, the variations of pressure exerted on envelope E entail either a bulge at the vertical of the trough of the waves as visible at the right of FIGS. 6 and 7, or a depression at the vertical of the crest of the waves as visible at the left of these Figures. This results in fluid displacement from one point to the other of the enclosure, with duct losses upon traverse of the sized orifices which throttle the fluid.

It is to be noted that, in every case, there is a withdrawal of water under the crest of the waves or at any rate a collapse straight below it, which tends to lower the level of this crest; in contrast, there is a delivery of water under the trough of the waves or at any rate a lift of the water column below it, which tends to raise the level of this trough. These cumulated effects result in some flattening out of the swell.

While I have been referring up to now only to natural swells which occur on wide stretches of water, it is to be understood that the area of application of the device of the invention, is not limited thereto and that the invention is applicable whenever one faces a problem due to agitation of a notable liquid mass. Thus in particular, the present invention is of conspicuous interest with regard to liquid carriage by sea (methane tankers, oil tankers and the like): because of roll and pitch, there is liable to occur in the tanks, if they are not completely filled, violent movements of the liquid (methane, oil or even sea water used as ballast) which could cause damages. The device of the invention, when submerged into the liquid content of the tank, will have for effect to "quieten" it.

The term "water" as used in the ensuing claims should therefore be interpreted as generic to any liquid.

I claim:

1. Swell abatement device for establishing a relatively quiescent zone on an agitated water surface, by means of a swell damper responsive to variations in water level between the crest and the trough of waves, said damper comprising:
    completely submerged first and second enclosures both extending entirely within the liquid mass, i.e., under the minimum datum level defined by the trough of the waves,
    first one-way flow orifice means on said first enclosure arranged for the in-flow of water into said first enclosure upon external overpressure,
    second one-way flow orifice means on said second enclosure arranged for the out-flow of water from said second enclosure, and
    hydraulic energy dissipating passage means connecting said first enclosure with said second enclosure.

2. Device as claimed in claim 1, wherein said first and second one-way flow orifice means each comprises check-valve means opening upon a predetermined pressure differential and urged to closure.

3. Swell abatement device for establishing a relatively quiescent zone on an agitated water surface, by means of a swell damper responsive to variations in water level between the crest and the trough of waves, said damper comprising a completely submerged enclosure extending entirely within the liquid mass, i.e., under the minimum datum level defined by the trough of the waves, said enclosure being designed for the variations in instantaneous hydrostatic pressure right below the crest and trough of the waves due to said variations in water level to induce fluid flows in said enclosure, said enclosure being a completely closed watertight resilient bag comprising a deformable envelope and partitioned into contiguous chambers communicating with each other through restricted passages developing duct losses upon traverse thereof by fluid enclosed in said bag and motioned by deformation of said envelope.

* * * * *